Dec. 1, 1959  F. AMIOT  2,915,032
SHIP'S HULL HAVING ELECTRICALLY INSULATED METAL COMPONENTS
Filed April 13, 1954

INVENTOR
Felix Amiot
BY
Bailey, Stephens & Huettig
ATTORNEYS

2,915,032

SHIP'S HULL HAVING ELECTRICALLY INSULATED METAL COMPONENTS

Felix Amiot, Paris, France

Application April 13, 1954, Serial No. 422,847

Claims priority, application France April 17, 1953

2 Claims. (Cl. 114—65)

The present invention relates to ships, and in particular mine sweepers, having a metallic framework constituted by light metal girders and plates assembled together, for instance by riveting.

This assembly of girders and plates constitutes a network of electrical circuits which are highly conductive because the cross sectional areas of the elementary girders and plates are very large and the light alloys of which said girders and plates are made have very low resistivities.

When such a ship is moving under the effect of waves, the conductor network thus constituted undergoes oscillatory displacements of substantial amplitude in the earth's magnetic field and due to this relative displacement of said network and said magnetic field eddy currents are induced in the electric circuits formed by the girders of the network.

These currents have high intensities because the electric circuits in which they are induced have low resistances for the reasons above set forth. Consequently these currents create about the ship a variable field of a period corresponding to that of the rolling movements of the ship and of an amplitude the higher as the ship is rolling more.

The existence of such a field is highly objectionable because it makes the ship detectable. In particular, if the ship is a magnetic mine sweeper, this field constitutes a serious danger even when the rolling amplitudes of the ship remain within acceptable limits.

The object of my invention is to provide a ship of the kind described which is free from this drawback.

For this purpose, according to my invention, in every portion of the ship framework constituted by a juxtaposition of elements forming a path for eddy currents, I interpose between at least some of said elements, in their assembly zones, electrical insulating means which interrupt said path.

A preferred embodiment of my invention will be hereinafter described with reference to the accompanying drawings, given merely by way of example, and in which.

Figure 1:
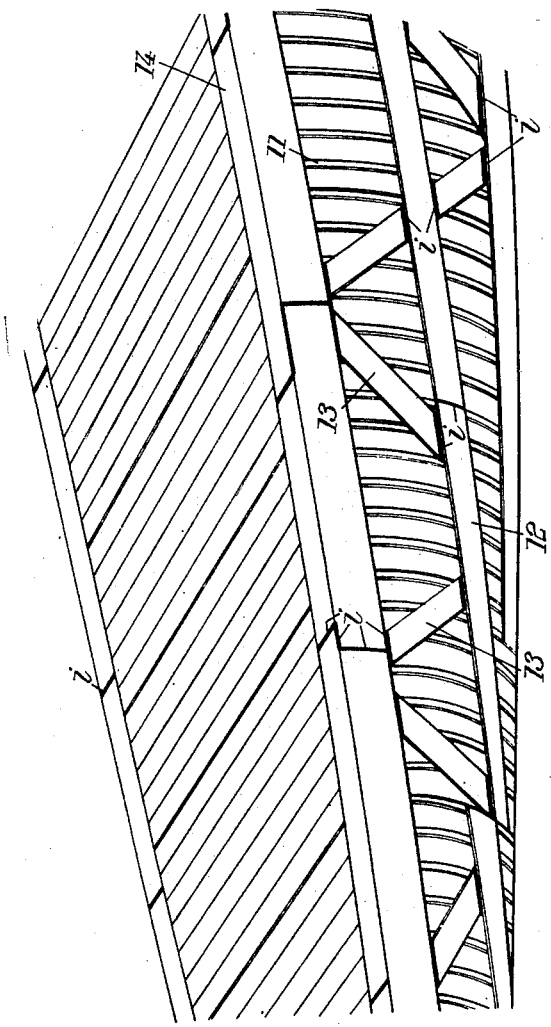
Fig. 1 is a diagrammatic perspective view of a portion of a ship framework according to my invention.

The ship framework diagrammatically shown by Fig. 1 includes frames 11 assembled with strakes 12, diagonals 13 and planksheers 14. Said framework units are constituted by the juxtaposition of elements such as girders and plates made of a light alloy, for instance an aluminium alloy. In such a construction, two of the diagonals 13 and the parts of strake 12 and bearer 14 between the diagonals constitute an elementary assembly extending along a closed curve.

According to my invention, at least some of the lines or surfaces of assembly of consecutive plates or girders belonging to said framework 11—12—13—14 are provided with electric insulating means such as $i$ to prevent electric connection between two adjacent girders or plates assembled together. Thus, although these girders or plates are juxtaposed along lines which otherwise would form paths for eddy currents, formation of such currents is practically prevented and the drawbacks above mentioned are eliminated.

Figure 2:
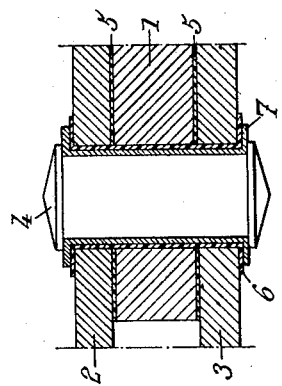
Fig. 2 is a detail view showing the assembly of three framework elements.

For practical purposes, the electric insulating means, in order to be effective, must also partly constitute the mechanical means through which juxtaposed framework elements are assembled together. Fig. 2 shows an example of such means.

In this case the framework elements to be secured to each other are 1, 2 and 3. They are held together by means of a rivet 4. Sheets 5 of an insulating material are interposed between elements 1 and 2 and between elements 1 and 3. Thus direct electric connection between elements 1, 2 and 3 is avoided. In order to avoid connection through rivet 4, a sleeve 6 of an insulating material is interposed between rivet 4 and the walls of the holes formed in elements 1, 2 and 3 for the passage of said rivet. This sheath is flanged at both ends to extend between the outer faces of elements 2 and 3 and the heads of the rivet. A steel sleeve such as 7 is preferably interposed between the insulating sleeve 6 and the rivet to protect the insulating material of said sleeve 6 during riveting and to support part of the shearing stresses exerted between the parts.

Thus, in addition to its electrical insulating properties the matter of which sleeve 6 is formed must have mechanical properties such that it can withstand the stresses that are transmitted therethrough. A resin polyester reinforced with glass fibers constitutes a satisfactory material for this purpose.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A ship hull constituted by a multiplicity of linearly extending metal elements assembled together so as to form a plurality of elementary assemblies extending along respective closed curves, said elementary assemblies being connected together to form the hull, and means interposed between at least two adjacent metal elements of each of said elementary assemblies for both mechanically securing said two last mentioned elements to one another and electrically insulating them from one another so that no electric path exists between two adjacent framework elements, whereby none of said elementary assemblies forms a closed electric circuit.

2. A ship hull constituted by a multiplicity of linearly extending metal elements assembled together so as to form a plurality of elementary assemblies extending along respective closed curves, said elementary assemblies being connected together to form the hull, a mechanical connecting part between each two of said metal elements which adjoin each other in one of said assemblies, electrical insulating means between said two last mentioned elements and electrical insulating means between each of said two last mentioned elements and said mechanical connecting part, said last mentioned insulating means being mounted to cooperate with said mechanical part to secure said two last mentioned elements to each other, whereby every elementary assembly of said metal elements is constituted by metal parts electrically insulated from one another.

(References on following page)

References Cited in the file of this patent

UNITED STATES PATENTS

| | | |
|---|---|---|
| 2,091,264 | Berry | Aug. 31, 1937 |
| 2,322,160 | Schlagel | June 15, 1943 |
| 2,394,764 | Greulich | Feb. 12, 1946 |
| 2,437,509 | Dawson | Mar. 9, 1948 |
| 2,446,860 | Wallace | Aug. 10, 1948 |
| 2,455,593 | Loewenstein | Dec. 7, 1948 |
| 2,511,816 | Shaw | June 13, 1950 |
| 2,661,969 | Thiry | Dec. 8, 1953 |

FOREIGN PATENTS

| | | |
|---|---|---|
| 644,618 | Germany | May 13, 1937 |